United States Patent [19]

Shia

[11] Patent Number: 4,556,618
[45] Date of Patent: Dec. 3, 1985

[54] BATTERY ELECTRODE AND METHOD OF MAKING

[75] Inventor: George A. Shia, North Tonawanda, N.Y.

[73] Assignee: Allied Corporation, Morris Township, Morris County, N.J.

[21] Appl. No.: 556,826

[22] Filed: Dec. 1, 1983

[51] Int. Cl.$^4$ .................. B29D 27/00; H01M 4/58; H01M 4/62

[52] U.S. Cl. .................................. 429/217; 264/41; 264/53; 264/127

[58] Field of Search .............. 264/49, 127, 41, 53; 570/150; 429/212, 217

[56] References Cited

U.S. PATENT DOCUMENTS

| | | | |
|---|---|---|---|
| Re. 30,667 | 7/1981 | Watanabe et al. | 429/212 X |
| 3,054,761 | 9/1962 | Moore et al. | |
| 3,281,511 | 10/1966 | Goldsmith | 264/127 X |
| 3,395,049 | 7/1968 | Thompson | 136/122 |
| 3,556,161 | 1/1971 | Roberts | 264/49 X |
| 3,813,461 | 5/1974 | Murayama et al. | 264/41 |
| 3,872,032 | 3/1975 | Kanemaru et al. | 570/150 X |
| 3,890,417 | 6/1975 | Vallance | 264/127 X |
| 3,892,590 | 7/1975 | Gunther | 429/217 |
| 3,904,501 | 9/1975 | Lagow et al. | 204/164 |
| 3,925,492 | 12/1975 | Ukaji et al. | 570/150 |
| 3,929,918 | 12/1975 | Meshri et al. | 570/150 |
| 3,929,920 | 12/1975 | Komo et al. | 570/150 |
| 3,962,153 | 6/1976 | Gore | |
| 4,031,033 | 6/1977 | Budevski et al. | 252/511 |
| 4,049,589 | 9/1977 | Sakane | |
| 4,071,946 | 2/1978 | Nilsson | 429/217 X |
| 4,089,758 | 5/1978 | McAloon | 204/98 |
| 4,110,392 | 8/1978 | Yamazaki | 264/127 |
| 4,110,519 | 8/1978 | Nilsson | 429/217 |
| 4,238,571 | 12/1980 | Mano et al. | 521/62 |
| 4,243,615 | 1/1981 | Watanabe et al. | 570/150 |
| 4,315,829 | 2/1982 | Duddy et al. | 429/217 X |
| 4,320,184 | 3/1982 | Bernstein et al. | 429/217 |
| 4,337,140 | 6/1982 | Solomon | 204/292 |
| 4,342,679 | 8/1982 | Abrahams | 524/401 |
| 4,353,853 | 10/1982 | Swift | 264/41 |
| 4,357,262 | 11/1982 | Solomon | 252/425.3 |
| 4,396,693 | 8/1983 | Bernstein et al. | 429/217 |
| 4,423,261 | 12/1983 | Watanabe et al. | 570/150 |
| 4,447,663 | 5/1984 | Akiyama et al. | 570/150 |

*Primary Examiner*—Philip Anderson
*Attorney, Agent, or Firm*—Arthur J. Plantamura; Jay P. Friedenson; Richard C. Stewart

[57] ABSTRACT

An improvement is provided for the manufacture of perhalogenated polymer, e.g., PTFE, bonded electrodes.

The formulation comprises a mixture of an active material is carbon monofluoride (otherwise known as fluorinated graphite or fluorinated carbon or $CF_x$ or $(C_2F)_n$); a conductive carbon additive, such as acetylene black or graphite; and polytetrafluoroethylene (PTFE).

The process comprises high shear mixing to cause the PTFE to fibrillate. The mixture is then wet with a non-polymeric pore-former to make the mixture more pliable and to create micropores in the electrode when the solution is removed by evaporation. The wet mixture is then sequentially suitably formed into a, e.g., extruded, or calendered or pressed to flatten the mixture to a thin sheet and rolled up and folded and pressed out again until a uniform sheet is obtained and the like.

The resulting product affords a sheet which is relatively flexible, and stronger and allows a lower PTFE loading than has been obtained with other electrode sheet materials formed with fibrillatable polymers. The higher the PTFE content, the higher the voltage losses for the electrode.

11 Claims, 1 Drawing Figure

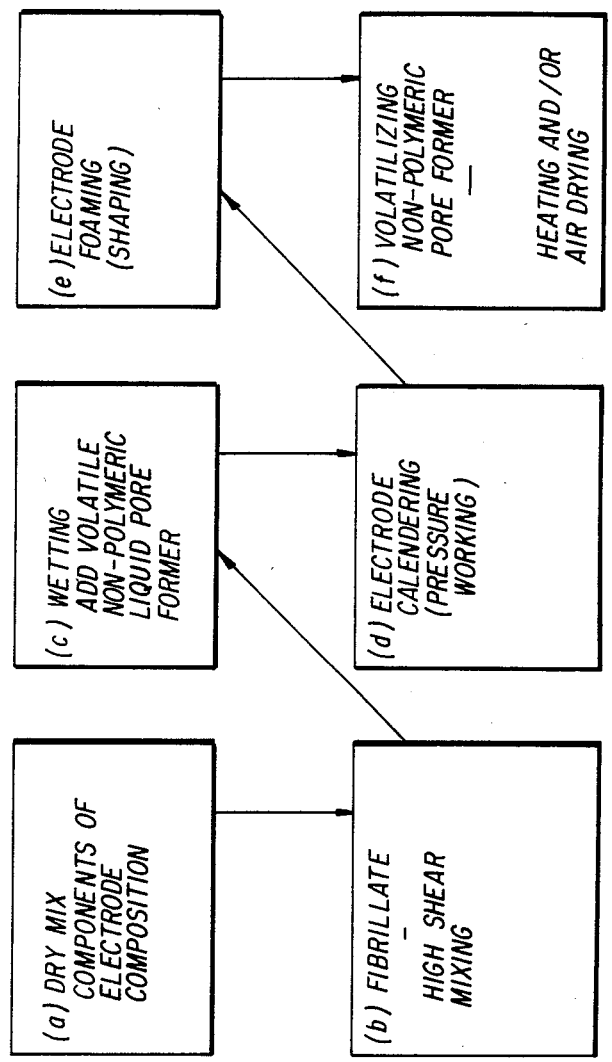

BATTERY ELECTRODE AND METHOD OF MAKING

The present invention relates to a method of making a battery which utilizes a fibrillated fluoropolymer binder and in which porosity is introduced into the bound composition.

BACKGROUND OF THE INVENTION

The provision of electrodes in which an electrode active material is bound by fibrillated polymers and having porosity introduced into the composition has been described in the prior art. U.S. Pat. No. 4,320,185, for example, discloses the production of an electrode of this kind; that patent employs, as the pore forming material, a polymer which is blended with the binder polymer and the electrode active material. This pore forming polymeric material is thereafter removed; this removal of the polymer requires a relatively burdensome and expensive procedure particularly in assuring that the removal of the comparatively difficult to extract polymeric substance is complete. Additionally, the extraction or leaching operation to remove this pore forming polymer has an adverse effect on the density and integrity generally of the resulting electrode composition.

Swelling of the electrode during leaching of the pore forming polymer reduces, interparticle contact within the electrode and thereby reduces the utilization of the electrode in use. Removal of the leaching solvent (e.g., hot water) from the electrode must be undertaken so as to have minimal adverse impact on the electrodes, (e.g., by evaporation); particularly when the electrode will be used as a cathode in a lithium or other alkali metal containing non-aqueous battery. Also small or residual amounts of polymeric pore-formers of the type described in U.S. Pat. No. 4,320,185 can be particularly detrimental in many battery systems as these polymers are soluble and can be converted in the battery by reaction (particularly with the cathode) to compounds which can cause corrosion, enhance self-discharge and foul the cathode and/or the anode.

Various other patents which disclose the formulation of porous sheets utilizing fluoropolymers. For example, U.S. Pat. Nos. 4,089,758; 3,813,461; 4,049,589; 3,962,153; and 4,110,392 deal with porous sheets or films wherein various technologies are used to stretch PTFE thereby producing micropores between the fibrils of PTFE. However, these patents are related to electrode technology only in that these porous sheets can be used as separators (or diaphragms) for electrolytic cells. These patents do not describe the means to support an active material and a conductive material with PTFE and then to form the supported mass into a working battery electrode.

The preparation of porous articles using PTFE is shown in U.S. Pat. Nos. 4,357,262; 3,054,761; 3,890,417; 3,556,161; 4,031,033; 4,238,571; and 4,353,853. These patents generally deal with preparing porous articles with PTFE and PTFE with other components. However, none of these patents describe the preparation of a battery electrode. These patents utilize water emulsions of PTFE to prepare the porous structure. Water emulsions of PTFE contain surfactants to keep the PTFE particles suspended in the liquid. These surfactants introduce the likelihood of a detrimental effect on the performance of the electrode. It is also difficult to control the distribution of materials using the slurry formulation methods employed with these PTFE emulsion. In no case do any of the methods employed in these patents use or recognize the necessity of a high shear mixing operation to fibrillate the PTFE thereby causing the mixture to become cohesive. Development of this cohesive property is necessary to formulation of a suitable electrode. Some of the patents in this group use heat or calendaring to achieve some fibrillation, but this does not achieve the required high a degree of fibrillation needed and which can be achieved in the process described herein. Thus, while considerable literature is available describing the formulation of electrically active aggregate which is bound by a fluoropolymer and wherein porosity is introduced into the bound composition, no prior art is known which affords a means for providing an improved electrode wherein the porosity is introduced with little or no disruption in the made up or shaped electrode sheet or article.

SUMMARY OF THE INVENTION

In the process of the present invention which involves the preparation of electrodes, e.g., battery cathodes, as well as the novel electrode itself, the formulation employed comprises a mixture of electrode active material such as carbon monofluoride (otherwise known as fluorinated graphite or fluorinated carbon or $CF_x$); a conductive carbon additive, such as acetylene black and/or graphite; and PTFE.

The electrode system prepared in accordance with the invention has structural integrity without the necessity of sintering the material or using a separate supporting structure. The electrode system is composed predominantly of the electrochemically active, also referred to as "active", "electro-active" or "electrode-active" material, i.e. over 80% by weight, is active material. Preferably the electrode-active material constitutes as least about 80%, and typically it constitutes more than 90% by weight of the electrode system.

The electrode-active material may be carbon monofluoride or any electrically active material such as iron, nickel, copper, mercury, cadmium, lead, manganese, silver, plantinum group metals, compounds thereof, e.g., oxides of mercury, silver cadmium, lead, manganese, alloys, mixtures and combinations thereof. The terms "electrode active" or "active" material will be understood to include elements, compounds, alloys, and mixtures thereof which can be converted even after incorporation in the electrode system into an active form including carbon and graphite, and in such case, the active material and carbon component may be the same. In general, the active material in the present electrode system is in powder form and preferably it is very finely divided. Typically, for example, the electrode active particles pass a $-100$ mesh screen and 60–70% pass a $-325$ mesh screen. It is preferred that the active particles be relatively fine although the system can accommodate significant changes in size and volume of the electrode-active material.

The electrode system is formed from a precursor electrode composition, which is comprised of fibrils developed from a fibrillatable polymer such as PTFE dispersed throughout a substance comprising electrode-active material which may be supplemented with up to about 25% by weight with a conductivity enhancing material such as acetylene black. As a pore forming mechanism, a volatile liquid such as alcohol or blends of water and alcohol or a fluorocarbon which are preferably removed by evaporation after the formed electrode sheet or article is prepared. Transformation to the electrode system is achieved by removal of the pore-former.

The precursor electrode composition is prepared from electrode active (or activatable) material, for example, a fluorinated carbon powder, such as carbon monofluoride, a fiber-forming polymer, and a removable, pore-former, by a method comprising subjecting said components to conditions for fibrillating the fiber-forming polymer and for developing an intimate mixture of such components throughout the composition. The components can be processed to fibrillate the fiber-forming polymer by a dry processing technique and under shear stresses. After removal of the pore-former, which is present in a major amount in the precursor electrode composition, the resultant electrode system is a porous, fiber-containing conductive material. The material can be produced as particle or shaped, e.g., as rods or tubes or as a thin, flexible sheet.

In the process it is essential that the fluorocarbon polymer blended with the electro-active material be sufficiently mixed and worked in a high shear process to cause the fluorinated binder polymer, e.g., PTFE to fibrillate. The mixture is then wet with a nonpolymeric pore-former to make the mixture more pliable and to create micropores in the electrode when the pore-former is removed by evaporation. The wet mixture is then sequentially calendered or pressed to flatten the mixture to a thin sheet and rolled up and folded and pressed out again until a uniform sheet is obtained or the fibrillated blend may be extruded in any shape and then cut into sheets or used in the extruded form.

The resulting sheet is flexible, strong and allows a lower PTFE loading than has been obtained with other electrode sheet materials formed with fibrillatable polymers. The higher the PTFE content, the higher the voltage losses within the electrode and the poorer a battery will perform.

A particularly advantageous aspect of the process of the invention resides in the use of a compatible, non-polymeric, relatively easily extractable pore-former. This avoids the need for, and difficulty of, removing from the electrode more tenaciously adhering substances, such as the polymeric pore-former, heretofore used for this purpose. Use of this relatively easily extractable pore-former in accordance with the invention also avoids the introduction of unwanted residual compounds from the manufacturing process (e.g., surfactants and additives in the polymer pore forming agents) which could be detrimental to the performance of the electrode or the battery.

BRIEF DESCRIPTION OF THE DRAWING

The FIGURE of the drawing illustrates the sequential steps, by way of a flow diagram, of the improved process of the invention for compounding, shaping, and introduction of uniform porosity into the electrode of the invention.

DETAILED DESCRIPTION OF THE INVENTION

In accordance with the invention, in a specific embodiment a cathode is fabricated from fluorinated carbon as the electro-active component, and which preferably incorporates a minor amount of acetylene black as a conductivity enhancing additive; and PTFE as the fibrillatable polymer. Mixing of the components is done in such a manner as to apply shear force onto the PTFE powder and results in a fibrillar network. Mixing is followed by pressing to calender the mixture into a cohesive mass which is then formed into the shaped electrode, e.g., a flexible cathode sheet.

In preparing the electrically active fluorinated carbon electrode the initial components, comprising the fluorinated carbon, i.e. the CFx material preferably supplemented with a minor amount of a conductivity enhancing material and the fibrillatable polymer are subjected to a shearing process by a dry processing technique to transform the components to a material composed of discrete fibers throughout an intimate mixture comprised of active material, (conductive carbon) components can be blended together initially, e.g., in a blender such as a Banbury mixer or a ball mill, and then processed to form the shaped article, e.g., in an extruder. In the above CFx formula, "x" represents a fluorine content generally in the range of 0.1 to 1.9 and preferably between 0.2 and 1.5. Alternatively, the components can be mixed with each other and processed in various sequences depending on the desired ultimate configuration and the equipment used to introduce porosity into the blend. During the processing, the blend is thoroughly wet with a suitable liquid pore-former that is readily removable without leaving an adverse impact on the blend or the condition of the shaped article, such as a suitable alcohol/or mixture, e.g., isopropanol-water mixture. Suitable pore forming liquids are generally those that may be volatilized by conventional means at temperatures between 50° C. and 250° C. and preferably between 70° C. and 150° C. By removal of the pore-former, the precursor electrode composition is converted to the desired electrode system. Advantageously, conversion of the fibrillatable polymer to the described fibrous condition is carried out in-situ. By conversion in-situ is meant that it is fibrillated in the presence of at least one of the components of the system, e.g., the active material.

The electrode system or precursor electrode composition can be formed as pellets and the pellets can be converted to the deisred shape by conventional polymer processing techniques, e.g., extrusion, molding, blowing or combinations thereof. As indicated above, with appropriate choice of processing technique, the components can be processed from a dry powder mixture which is then thoroughly wetted with the pore-forming liquid and formed directly to a sheet or bat. The pore forming volatile liquid is conveniently extracted in the course of forming the components into the desired shaped electrode. The thickness of the sheet or bat can be varied and the electrode material can be produced directly as a flexible sheet or film. Alternatively, for example, it can be made into pellets and the pellets extruded and blown to a film or the pellets can be injection molded to a film.

Typically, suitable electrode system can be made of about 1 to several hundred mills thick. Porosity and conductivity of the electrode system can be controlled, e.g., with appropriate use of pore-formers and processing parameters. The bound electrode composition can be processed immediately or stored in a dry state and then it can be thoroughly wetted with the pore forming liquid which is then removed during the electrode shaping process or by controlled heating, for example. The electrode can be made as a flexible film in any desired thickness, and it can be easily combined with a current collector such as a conductive film, wire screen or expanded metal.

The invention will be further illustrated by the following examples in which parts given are parts by weight unless otherwise stated.

EXAMPLE 1

Preparation of a Carbon Monofluoride - PTFE Cathode

1. Carbon monofluoride ($CF_x$), acetylene black (Shawinigan), and PTFE (DuPont K-10 powder) were weighed out and placed into a grinding mortar. The proportions were as follows. $CF_x$: acetylene black: PTFE (1g : 0.15g : 0.04g). These proportions are not critical, but it would be best to keep the level of PTFE as low as possible.

2. The mixture was ground with the pestle and this caused the PTFE to fibrillate. Fibrillation is the elongation of the PTFE particles into thin fibers or fibrils. These fibrils hold the other components of the mixture into a cohesive mass. Grinding was continued with occasional scraping of the walls of the mortar until the loose powders were totally collected into one mass and no loose powders remained.

3. The mixture was then wet with a water/isopropanol solution to form a very thick paste. Usually one milliliter has been used in the past, but this amount may be varied. Other solution or solvents compatible with the components of the mixture could be used as the only purpose of the solution is to make the dry mixture more pliable and to create micropores in the electrode when the solution is removed by evaporation.

4. The wet mixture was then pressed out or calendered between two stainless steel platens. The pressure used was 5000 lbs. on the 6"×6" square platens. The pressure which is used can be varied but should be sufficient to flatten the mixture into a thin sheet (less than 5 mils thick). The flattened sheet was then rolled up and folded into a small square and pressed out again. This pressing and rolling was repeated 6 times. The number of times the above calendering step must be repeated is variable; but should be repeated until the material looks uniform and has a leathery or rubber-like texture. After calendering the material in this manner, the fibrils that were created by high shear mixing are knit together to bind the mixture into one sheet. A final pressing can be undertaken at this point with shims between the platens to control the final thickness of the electrode.

5. Any size or shape of electrode can be cut from the sheet and then can be bent or rolled into any shape before it is dried. After drying the sheets lose a very small amount of their flexibility; the amount depends on the bulk density of the material (this is controlled by the amount of liquid used in step 3 and the number of pressings used in step 4).

In evaluating the electrochemical performance of these cathodes, a 0.5 inch I.D. Teflon Swagelok fitting was employed as a demountable cell body with two stainless steel pistons to back-up and make electrical contact to the cathode and anode buttons. The anode is a 0.5 inch button cut from lithium strip stock. The separator is cut the same size as the anode and is a 0.009 inch thick non-woven polypropylene absorber purchased from RAI Research Corp. The cathode is a 0.375 inch diameter button cut from a sheet of cathode material 0.020 inch thick. The electrolyte is a 1:1 mixture of propylene carbonate and dimethoxyethane containing 1 mole/liter of $LiBF_4$. The cells are assembled in a dry box. Cells are discharged on a 10 Kohm load to a 2V cutoff and run for about 100 hours at this drain rate.

EXAMPLE 2

In a second example, approximately 80 grams of carbon monofluoride, 10 grams of acetylene black (Shawinigan), 2 grams of PTFE (DuPont K-10 powder) and 60 cc of water/isopropanol solution were intimately mixed. Approximately half the volume of the damped powders were into a C. W. Brabender, Inc. Plasti-Corder with a roller mixer-measuring head (60 ml. capacity) for high shear mixing. Mixing was carried out at room temperature (approximately 25° C.) for 5 minutes at 20 rpm. After removing the fibrillated mixture from the mixer, a portion of the material was calendered as in Example 1. Electrodes made in this fashion perform in cell tests like those discribed in Example 1.

The types of pore forming liquids can be alcohols of 1-8C atoms, fluoro-chloro carbons of 1 to 3C atoms, water, hexane, kerosines, light oils, and the like. Any liquid of mixture of liquids can be used provided the liquid or mixture wets the electrode material, can be removed by evaporation without leaving any residue, and does not react with any component of the mixture.

The fluorinated graphite or fluorinated carbon, $CFx$ materials contemplated in the inventory also include those referred to in the art as ($C_2F$) in active materials wherein "n" is an indefinitely large number as found in naturally occurring fluorinated carbonaceous materials.

It is thus seen that the present invention affords a method and product having a significantly improved electrode. The advantages include the following aspects:

1. The sheet of electrode material is flexible making it ideally suited for use in cylindrical cells employing the so-called "jelly roll" configuration for the cathode-anode assemblies. In these cells a strip of the cathode and anode are laid one atop the other and the two strips are rolled up together to form a cylinderically-shaped cell element. Obviously, cathodes used in these cells must be flexible so that they will tolerate the rolling operation without breaking or spalling off the current collector.

2. The level of inert, electrically insulating binder (i.e., PTFE) is very low (less than 3% by wt.) so that good electrical conductivity is maintained. Typically, the higher the level of PTFE in an electrode the higher the voltage losses are for that electrode. The lower level of binder will also provide for more active material in the electrode and give electrodes with higher capacity per unit volume.

3. The use of volatile solutions or solvents to wet the electrode is important because they are easily removed by evaporation. Evaporation will not disrupt the structure of the electrode. Residues of polymeric material and surfactants which could be detrimental to the performance or life of a battery are avoided.

4. This electrode formulation technique is amenable for use on plastic milling equipment and probably can be adapted to give sheet electrodes in a continuous process.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

What is claimed is:

1. A method of producing a porous conductive battery electrode comprising blending an electrode-active solid material with from about 0.5 to about 10 percent by weight of a fibrillatable fluoropolymer and with from about 30 to about 60 percent by weight of a wetting, volatile, substantially non-polymeric, pore-forming liquid, subjecting the blend to a shearing process until the blend in converted into a self-sustaining cohesive mass in which the electrode-active material is wholly bound by the fibrillated fluoropolymer; and is intimately wetted by said non-polymeric liquid, forming said blend into the desired shaped electrode, and imparting porosity to said electrode without disrupting said formed shape by volatilizing said non-polymeric liquid from the shaped electrode.

2. The method of claim 1 wherein the extraction of said volatile pore forming liquid is effected during the formulation of said composition into the desired shaped electrode.

3. The method of claim 1 wherein from about 1 percent to about 25 percent by weight of electrical conductivity enhancing particulate material is added to said active material.

4. The method of claim 3 wherein the electrical conductivity enhancing material is acetylene black.

5. The method of claim 1 wherein the electrode active material is carbon monofluoride.

6. The method of claim 1 wherein the fluoropolymer is PTFE.

7. The method of claim 1 wherein the fluorinated polymer is present in amounts of from 0.5 percent to 4 percent by weight of the total composition.

8. The method of claim 4 wherein the fluoropolymer is PTFE.

9. The method of claim 8 wherein the electrode-active material is carbon monofluoride.

10. A product made by the method of claim 1.

11. A product made by the method of claim 9.

* * * * *